US012569995B2

(12) United States Patent
Maeda et al.

(10) Patent No.: US 12,569,995 B2
(45) Date of Patent: Mar. 10, 2026

(54) PATH GENERATION FOR MANUAL ROBOT TEACHING

(71) Applicant: KABUSHIKI KAISHA YASKAWA DENKI, Kitakyushu (JP)

(72) Inventors: Takahiro Maeda, Fukuoka (JP); Yuta Arita, Fukuoka (JP); Motoharu Maruno, Fukuoka (JP)

( * ) Notice: Subject to any disclaimer, the term of this patent is extended or adjusted under 35 U.S.C. 154(b) by 237 days.

(21) Appl. No.: 18/178,536

(22) Filed: Mar. 6, 2023

(65) Prior Publication Data

US 2023/0286153 A1     Sep. 14, 2023

(30) Foreign Application Priority Data

Mar. 8, 2022     (JP) ................................. 2022-035105

(51) Int. Cl.
*B25J 9/16*          (2006.01)
*B25J 9/00*          (2006.01)
(Continued)

(52) U.S. Cl.
CPC ........... *B25J 9/1664* (2013.01); *B25J 9/0081* (2013.01); *G05B 19/425* (2013.01); *G05B 19/427* (2013.01); *G05B 2219/39001* (2013.01)

(58) Field of Classification Search
CPC ....... B25J 9/0081; B25J 9/1664; G05B 19/42; G05B 19/425; G05B 19/427; G05B 2219/39001
See application file for complete search history.

(56) References Cited

U.S. PATENT DOCUMENTS

| 5,937,143 A * | 8/1999 | Watanabe | .............. B25J 9/1671 |
| | | | 700/264 |
| 2003/0018411 A1* | 1/2003 | Suita | .................... G05B 19/409 |
| | | | 700/245 |

(Continued)

FOREIGN PATENT DOCUMENTS

| CN | 110315517 | 10/2019 |
| EP | 0930554 | 7/1999 |

(Continued)

OTHER PUBLICATIONS

G. Bolano, A. Roennau, R. Dillmann and A. Groz, "Virtual Reality for Offline Programming of Robotic Applications with Online Teaching Methods," 2020 17th International Conference on Ubiquitous Robots (UR), Kyoto, Japan, 2020, pp. 625-630, doi: 10.1109/UR49135.2020.9144806. (Year: 2020).*

(Continued)

*Primary Examiner* — Dale Moyer
(74) *Attorney, Agent, or Firm* — SHIPWAY IP

(57)          ABSTRACT

A robot system includes: a robot; a robot controller configured to control the robot based on sequential taught positions; and a teaching device communicative with the robot controller and configured to receive operations by an operator, wherein the robot controller includes circuitry configured to: generate, in response to determining that a target position is designated by the operator on the teaching device, a path from a current position of the robot to the target position by simulation of moving the robot based on surrounding environmental information of the robot; and move the robot toward the target position along the generated path.

20 Claims, 9 Drawing Sheets

(51) Int. Cl.
 *G05B 19/425* (2006.01)
 *G05B 19/427* (2006.01)

(56) References Cited

U.S. PATENT DOCUMENTS

| | | | |
|---|---|---|---|
| 2004/0189631 A1 | 9/2004 | Kazi et al. | |
| 2010/0161123 A1* | 6/2010 | Ando | B25J 9/1682 |
| | | | 700/248 |
| 2011/0288667 A1 | 11/2011 | Noda et al. | |
| 2015/0266182 A1 | 9/2015 | Strandberg | |
| 2018/0236657 A1 | 8/2018 | Kuwahara et al. | |
| 2019/0015972 A1 | 1/2019 | Someya | |
| 2019/0240833 A1* | 8/2019 | Kimura | B25J 9/1664 |
| 2019/0299399 A1 | 10/2019 | Izumi et al. | |
| 2019/0351546 A1 | 11/2019 | Sakaguchi et al. | |
| 2019/0375104 A1 | 12/2019 | Moriya et al. | |

FOREIGN PATENT DOCUMENTS

| | | | |
|---|---|---|---|
| JP | H6-102919 | | 4/1994 |
| JP | H9-034524 | | 2/1997 |
| JP | H11-024720 | | 1/1999 |
| JP | 2003-280710 | | 10/2003 |
| JP | 2004-243516 | | 9/2004 |
| JP | 2008-221428 | | 9/2008 |
| JP | 2012-106323 | | 6/2012 |
| JP | 2018-134703 | | 8/2018 |
| JP | 2019-193975 | | 11/2019 |
| JP | 2019-198925 | | 11/2019 |
| JP | 2020-082285 | | 6/2020 |
| JP | 2020082285 A | * | 6/2020 |
| WO | 2010/092981 | | 8/2010 |

OTHER PUBLICATIONS

Office Action issued in Japanese Patent Application No. P2022-035105, dated Jul. 12, 2022 (with English partial translation).
Office Action issued in Japanese Patent Application No. P2022-035105, dated Nov. 22, 2022 (with English partial translation).
Bolano Gabriele et al, "Virtual Reality for Offline Programming of Robotic Applications with Online Teaching Methods", 2020 17th International Conference on Ubiquitous Robots (UR), IEEE, Jun. 22, 2020, p. 625-p. 630.
Extended Search Report in corresponding European Application No. 23160183.2, dated Aug. 8, 2023.

* cited by examiner

PATH GENERATION FOR MANUAL ROBOT TEACHING

CROSS-REFERENCE TO RELATED APPLICATIONS

This application is based upon and claims the benefit of priority from Japanese Patent Application No. 2022-035105, filed on Mar. 8, 2022. The entire contents of which are incorporated herein by reference.

BACKGROUND

Field

The present disclosure relates to a robot system, a control method and a memory device.

Description of the Related Art

Japanese Unexamined Patent Publication No. 2019-198925 discloses a control system including a controller and an operation device. The operation device acquires an operation input by an operator, generates a command based on the operation input, and outputs the command to the controller. The controller controls a robot in accordance with commands from the operation device.

SUMMARY

Disclosed herein is a robot system. The robot system may include: a robot; a robot controller configured to control the robot; and a teaching device communicative with the robot controller and configured to receive operations by an operator. The robot controller may include circuitry configured to: generate, in response to determining that a target position is designated by the operator on the teaching device, a path from a current position of the robot to the target position by simulation of moving the robot based on surrounding environmental information of the robot; move the robot toward the target position along the generated path; move, in response to determining that a moving direction is designated by the operator on the teaching device, the robot toward the moving direction; add, in response to an adding operation by the operator on the teaching device, a position of the robot at a time of the adding operation to a plurality of taught positions; and cause the robot to playback a taught motion defined by the plurality of taught positions including the position added in response to the adding operation.

Additionally, a control method is disclosed herein. The control method may include: generating, in response to determining that a target position is designated by an operator on a teaching device, a path from a current position of a robot to the target position by simulation of moving the robot based on surrounding environmental information of the robot; moving the robot toward the target position along the generated path; moving, in response to determining that a moving direction is designated by the operator on the teaching device, the robot toward the moving direction; adding, in response to an adding operation by the operator on the teaching device, a position of the robot at a time of the adding operation to a plurality of taught positions; and causing the robot to playback a taught motion defined by the plurality of taught positions including the position added in response to the adding operation.

Additionally, a non-transitory memory device is disclosed herein. The memory device may include: generating, in response to determining that a target position is designated by an operator on a teaching device, a path from a current position of a robot to the target position by simulation of moving the robot based on surrounding environmental information of the robot; moving the robot toward the target position along the generated path; moving, in response to determining that a moving direction is designated by the operator on the teaching device, the robot toward the moving direction; adding, in response to an adding operation by the operator on the teaching device, a position of the robot at a time of the adding operation to a plurality of taught positions; and causing the robot to playback a taught motion defined by the plurality of taught positions including the position added in response to the adding operation.

DETAILED DESCRIPTION

In the following description, with reference to the drawings, the same reference numbers are assigned to the same components or to similar components having the same function, and overlapping description is omitted.

Robot System

Figure 1:
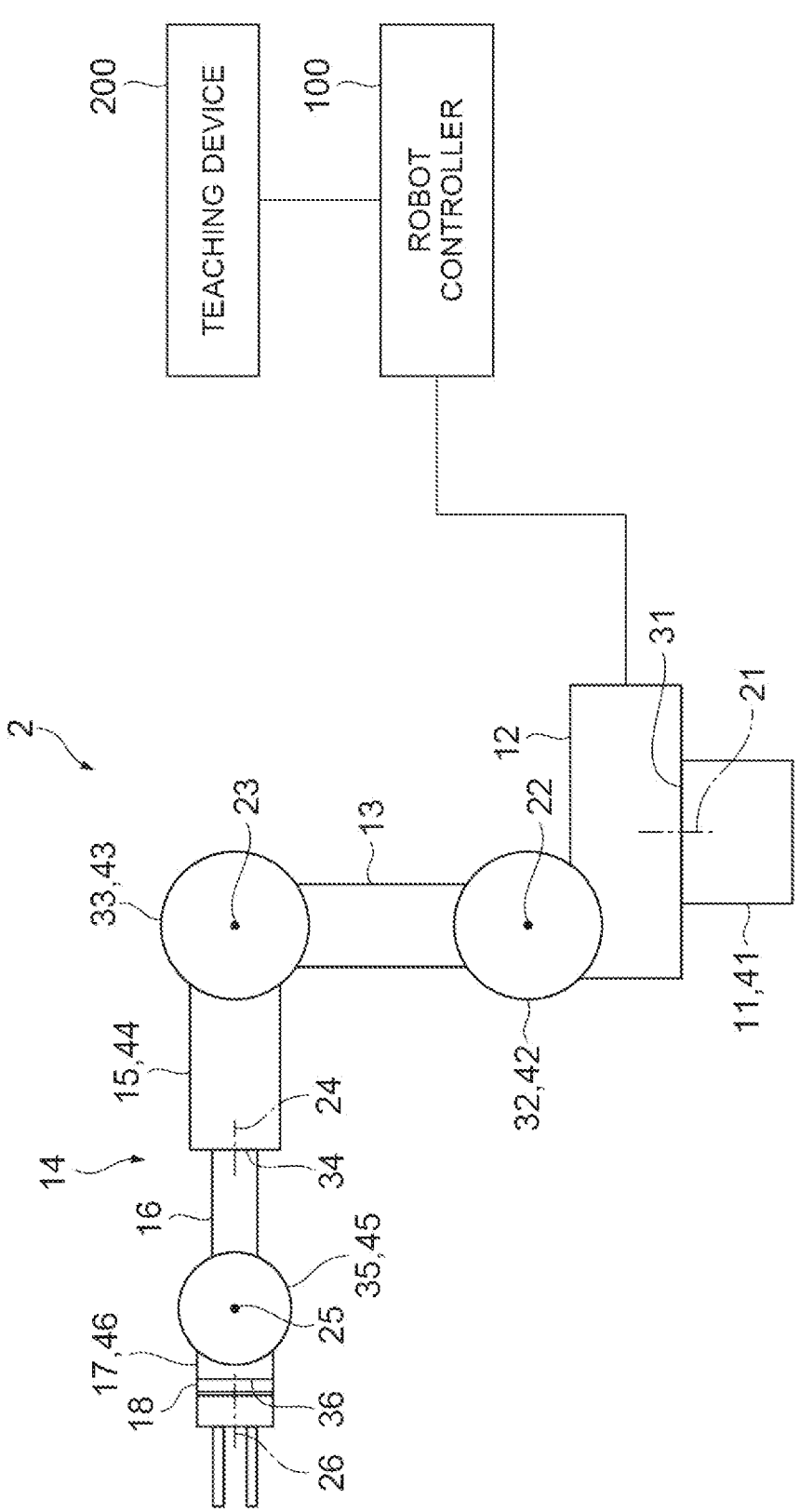
FIG. 1 is a schematic diagram illustrating an example configuration of a robot system.

A robot system 1 illustrated in FIG. 1 is a system of a so-called teaching playback method for operating a robot 2 based on a motion program generated by teaching by an operator. As illustrated in FIG. 1, the robot system 1 includes the robot 2, a robot controller 100, and a teaching device 200.

The robot 2 illustrated in FIG. 1 is a six-axis vertical articulated robot with a base 11, a pivoting portion 12, a first arm 13, a second arm 14, a third arm 17, a tip part 18, and actuators 41, 42, 43, 44, 45, 46. The base 11 is installed on a floor surface, a wall surface, a roof surface, an automatic guided vehicle, or the like. The pivoting portion 12 is mounted on the base 11 to pivot about a vertical axis 21. The first arm 13 is connected to the pivoting portion 12 to swing about an axis 22 that intersects (for example, is orthogonal to) the axis 21 and extends away from the axis 22. The intersection includes a case where there is a twisted relationship such as so-called three-dimensional crossing. The same applies to the following description.

The second arm 14 is connected to the tip part of the first arm 13 so as to swing about an axis 23 substantially parallel to the axis 22 and extends away from the axis 23. The second arm 14 includes an arm base 15 and an arm end 16. The arm base 15 is connected to the tip part of the first arm 13. The arm end 16 is connected to the tip part of the arm base 15 to pivot about an axis 24 that intersects (for example, is orthogonal to) the axis 23 and extends along the axis 24 in a direction away from the arm base 15.

The third arm 17 is connected to the tip part of the arm end 16 so as to swing around an axis 25 that intersects (for example, orthogonal to) the axis 24. The tip part 18 is connected to the tip part of the third arm 17 to pivot about an axis 26 that intersects (e.g., is orthogonal to) the axis 25.

As described above, the robot 2 includes a joint 31 that connects the base 11 and the pivoting portion 12, a joint 32 that connects the pivoting portion 12 and the first arm 13, a joint 33 that connects the first arm 13 and the second arm 14, a joint 34 that connects the arm base 15 and the arm end 16 in the second arm 14, a joint 35 that connects the arm end 16 and the third arm 17, and a joint 36 that connects the third arm 17 and the tip part 18.

The actuators 41, 42, 43, 44, 45, 46 include, for example, an electric motor and a speed reducer to respectively drive the joints 31, 32, 33, 34, 35, 36. For example, the actuator 41 pivots the pivoting portion 12 about the axis 21. The actuator 42 swings the first arm 13 about the axis 22. The actuator 43 swings the second arm 14 about the axis 23. The actuator 44 pivots the arm end 16 about the axis 24. The actuator 45 swings the third arm 17 about the axis 25. The actuator 46 pivots the tip part 18 about the axis 26.

The configuration of the robot 2 can be modified. For example, the robot 2 may be a seven-axis redundant robot in which one joint is further added to the six-axis vertical articulated robot described above, or may be a so-called SCARA type articulated robot.

The teaching device 200 receives operations by an operator at the time of teaching. The operations include one or more moving operations for moving the robot and an adding input for adding a position of the moved robot to the taught positions. For example, the operations by the operator includes a jog operation, an adding operation of a position of the robot to the taught positions, and a playback operation. The robot controller 100 moves the robot 2 in response to the jog operation, and, every time the adding operation is received, add a current position of the robot to the taught positions. For example, the controller designates the current position of the robot as an additional taught position and stores, in the teaching motion storage unit 113, a taught motion command for moving the robot toward the additional taught position. Thus, an operation program including a plurality of taught motion commands in time series is generated in the teaching motion storage unit 113.

For example, the teaching device 200 is a so-called "teaching pendant" or "programming pendant" that is used in a field for operating the robot. The teaching device 200 is a handy device that can be held by an operator in the field for performing the operations while directly monitoring the motion of the robot in the field. The teaching device 200 include an operation panel including multiple objects for receiving operations of the operator.

The taught position (each of the taught positions) is information that defines the coordinates of the tip part 18 in the three-dimensional coordinate system and the posture of the tip part 18 around each coordinate axis. The taught position may be information that directly defines the coordinates and posture of the tip part 18 or may be information that indirectly defines the coordinates and posture of the tip part 18. Examples of information that indirectly defines the coordinates and posture of the tip part 18 include the rotation angles of the joints 31, 32, 33, 34, 35, 36.

The taught motion command includes a motion speed of the tip part 18 to the taught position and an interpolation condition defining a movement trajectory of the tip part 18 to the taught position. Examples of the interpolation condition include the following.

Interpolation condition 1) The movement trajectory of the tip part 18 from the position of the robot 2 immediately before executing the taught motion command (hereinafter referred to as "previous position") to the taught position is linearized.

Interpolation condition 2) The movement trajectory of the tip part 18 from the previous position to the taught position is S-shaped.

Interpolation condition 3) The angles of the joints 31, 32, 33, 34, 35, 36 are changed at the same rate from the previous position to the taught position.

The operations received by the teaching device 200 may further include an operation of adding a position variable. Similar to the taught position, the position variable is information that defines the coordinates of the tip part 18 in the three-dimensional coordinate system and the posture of the tip part 18 around each coordinate axis. The robot controller 100 stores the position variable in a storage area different from the teaching motion storage unit 113 in response to addition operation of the position variable.

Figure 2:
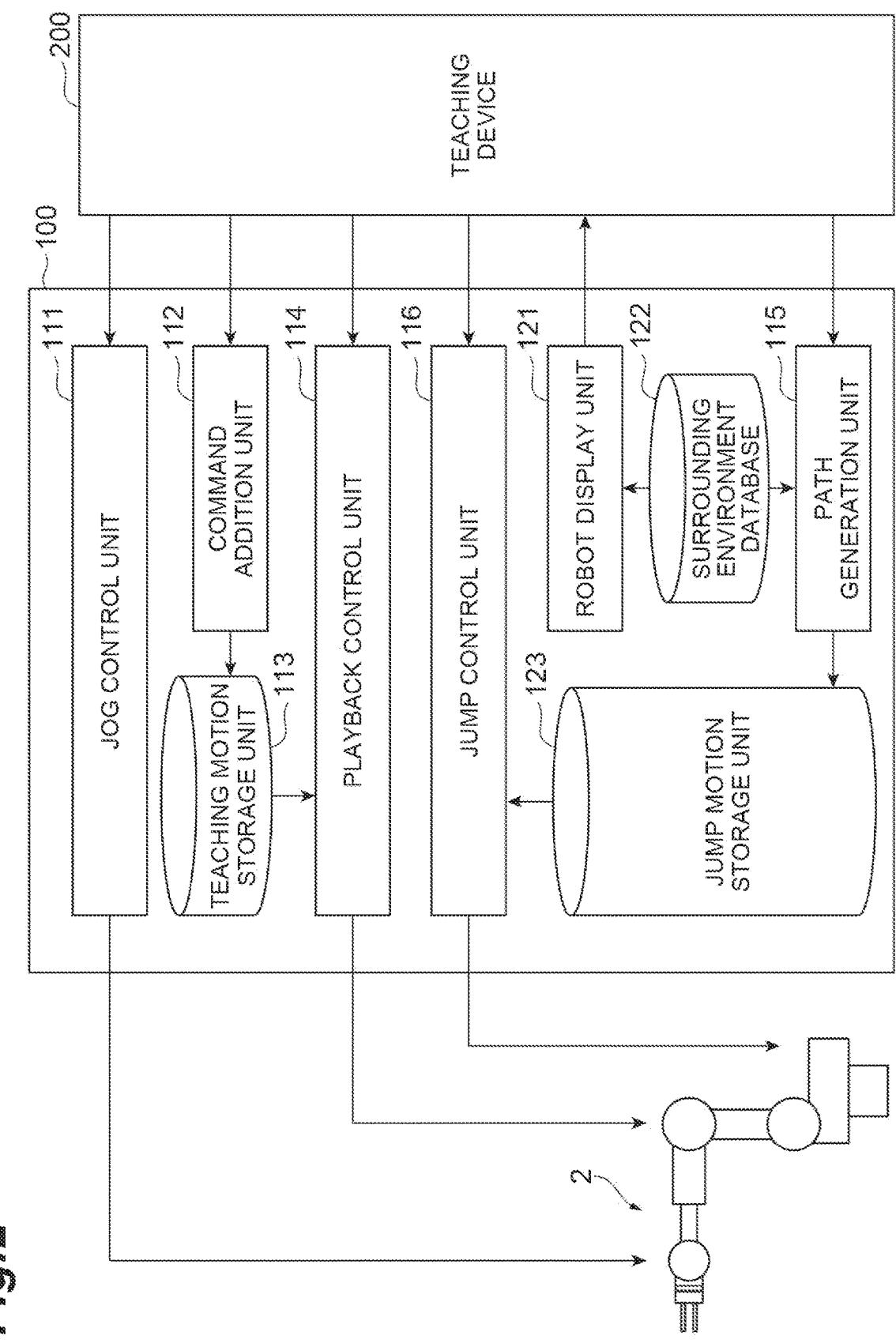
FIG. 2 is a block diagram illustrating an example functional configuration of a controller.

For example, the robot controller 100 has a jog control unit 111, a command addition unit 112, and a playback control unit 114 as functional components (hereinafter referred to as "functional block"), as illustrated in FIG. 2. When a jog operation is received by the teaching device 200, the jog control unit 111 is configured to move the robot 2 in response to the jog operation. The jog operation is, for example, an operation for defining a moving direction and a moving amount of the tip part 18. The jog control unit 111 operates the robot 2 to move the tip part 18 in the direction and the amount of movement defined by the jog operation received by the teaching device 200. The moving direction includes a changing direction of the coordinates of the tip part 18 and a changing direction of the posture of the tip part 18.

There is no particular limitation on how the teaching device 200 accepts the jog operation. For example, the teaching device 200 may receive the jog operation based on an operation on an object such as a key, may receive the jog operation based on a recognition result of a voice of the operator, or may receive the jog operation based on a recognition result of a gesture performed by the operator.

The command addition unit 112 is configured to store, every time the adding operation is received by the teaching device 200, the taught motion command for operating the robot 2 to the additional taught position in the teaching motion storage unit 113. For example, the command addition unit 112 generates a taught motion command using the position of the robot 2 at the time of receiving the adding operation by the teaching device 200 as the taught position, and stores the generated teaching command in the teaching motion storage unit 113. As the command addition unit 112 sequentially stores the plurality of taught motion commands in the teaching motion storage unit 113, a motion program including a plurality of taught motion commands in time series is generated in the teaching motion storage unit 113. The teaching motion storage unit 113 may be provided in a storage device of the robot controller 100, or may be provided in an external storage device capable of communicating with the robot controller 100.

The playback control unit 114 is configured to, in response to the one or more moving operations, cause the robot to execute a playback motion based on the taught positions. For example, the playback control unit is configured to sequentially call the plurality of taught motion commands stored in the teaching motion storage unit 113 and causes the robot 2 to execute a motion represented by the taught positions of the plurality of taught motion commands. For example, the playback control unit 114 repeats playback control in a constant control cycle. The playback control includes calculating respective target angles of the joints 31, 32, 33, 34, 35, 36 to move the robot 2 along a teaching motion path represented by the taught positions of the plurality of taught motion commands and causing the respective angles of the joints 31, 32, 33, 34, 35, 36 to follow the target angle.

As described above, in the robot system 1, teaching (generation of the motion program by addition of the teaching positions) is performed by the operator by operating the robot 2. When the robot 2 is manually operated, if not only the robot 2 can be moved little by little by the jog operation but also the robot 2 can be moved at once to the target position apart from the current position, the efficiency of teaching is improved. For example, the operator may teach more than two motions for more than two positions that are apart from each other. In that case, the operator has to move the robot along a long path from an end position of one motion to a start position of another motion. In that case, an automatic operation of the robot 2 along the long path may be very convenient for the operator. However, there may be an obstacle between the current position and the distant target position. The operator may frequently correct the moving direction of the robot 2 to avoid the obstacle, and the efficiency of teaching cannot be improved as expected.

Thus, the robot controller 100 is further configured to generate, in response to determining that a target position is designated by the one or more moving operations on the teaching device 200, a path from a current position of the robot to the target position based on surrounding environmental information of the robot; and causing the robot 2 to execute a path motion toward the target position along the generated path.

For example, the robot controller 100 further includes a path generation unit 115 and a jump control unit 116 as functional blocks. The path generation unit 115 is configured to generate, in response to determining that a target position is designated by the one or more moving operations on the teaching device 200, a path (jump motion path) from a current position of the robot to the target position by simulation of moving the robot based on surrounding environmental information of the robot 2. For example, the path generation unit 115 generates the jump motion path from the current position to the target position based on surrounding environmental information stored in a surrounding environment database 122.

The target position is information that defines the coordinates of the tip part 18 in the three-dimensional coordinate system and the posture of the tip part 18 around each coordinate axis. The target position may be information that directly defines the coordinates and posture of the tip part 18, or information that indirectly defines the coordinates and posture of the tip part 18. Examples of information that indirectly defines the coordinates and the posture of the tip part 18 include the rotation angles of the joints 31, 32, 33, 34, 35, 36.

For example, the surrounding environment database 122 stores three-dimensional model data of a plurality of objects including the robot 2 and surrounding objects of the robot 2 as surrounding environmental information. The surrounding environment database 122 may be provided in a storage device of the robot controller 100, or may be provided in an external storage device capable of communicating with the robot controller 100.

The path generation unit 115 may be configured to generate the path to prevent the robot 2 from interfering with peripheral objects by simulating a motion of the robot from the current position to the target position in the simulation. For example, the path generation unit 115 may calculate one or more via positions including the target position based on the surrounding environmental information, and generate one or more jump motion commands to move the robot 2 to the one or more via positions. Each of the one or more via positions is information that defines the coordinates of the tip part 18 in the three-dimensional coordinate system and the posture of the tip part 18 around each coordinate axis. The via positions may be information that directly defines the coordinates and posture of the tip part 18, or may be information that indirectly defines the coordinates and posture of the tip part 18. Examples of information that indirectly defines the coordinates and posture of the tip part 18 include the rotation angles of the joints 31, 32, 33, 34, 35, 36.

The jump motion command includes a motion speed of the tip part 18 to the via position and an interpolation condition that defines a movement trajectory of the tip part 18 to the via position. Examples of the interpolation condition include the following.

Interpolation condition 1) The movement trajectory of the tip part 18 from the position of the robot 2 immediately before executing the jump motion command (hereinafter referred to as "previous position") to the via position is linearized.

Interpolation condition 2) The movement trajectory of the tip part 18 from the previous position to the via position is S-shaped.

Interpolation condition 3) The angles of the joints 31, 32, 33, 34, 35, 36 are changed at the same rate of change with each other from the previous position to the taught position.

The path generation unit 115 generates a jump motion path so that the robot 2 does not interfere with surrounding objects and the robot 2 itself. The path generation unit 115 first executes linear interpolation between the current position and the target position to tentatively generate a jump motion path, and simulates the motion of the robot 2 based on the tentatively generated jump motion path based on the surrounding environmental information stored in the surrounding environment database 122. As a result of the simulation, when it is determined that the robot 2 interferes with the surrounding object or the robot 2 itself, the path generation unit 115 randomly generates a via position that does not interfere with the surrounding object and the robot 2 itself and adds the via position between the current position and the target position. Thereafter, the generation and addition of the via position are repeated until the robot 2 does not interfere with the peripheral object and the robot 2 itself by a jump motion path connecting the current position, the generated one or more via positions, and the target position. Thereafter, the path generation unit 115 generates two or more jump motion commands each having the added one or more via positions and target position as via positions.

If the robot 2 does not interfere with the peripheral object and the robot 2 itself even by the jump motion path tentatively generated by linearly interpolating the current position and the target position, the path generation unit 115 does not add the via position and generates a jump motion command in the robot system 1 having the target position as the via position.

The method of generating the jump motion path is not limited to the illustrated method. For example, the path generation unit 115 may generate a jump motion path, such as by a geometric algorithm, such that the robot 2 does not interfere with surrounding objects and the robot 2 itself.

The path generation unit 115 stores the generated one or more jump motion commands in a jump motion storage unit 123 separate from the teaching motion storage unit 113. When the path generation unit 115 stores one or more jump motion commands in the jump motion storage unit 123, a jump motion program representing a path from the current position to the target position by the one or more jump motion commands is generated in the jump motion storage unit 123. The jump motion storage unit 123 may be provided in a storage device of the robot controller 100, or may be provided in an external storage device capable of communicating with the robot controller 100.

The path generation unit 115 may request an external computing device to generate the path described above. If the external computing device generates the jump motion path based on the surrounding environmental information, causing the external computing device to generate the jump motion path is also included in generating the jump motion path based on the surrounding environmental information.

The path generation unit 115 may generate the jump motion path to the target position designated by the one or more moving operations. For example, the path generation unit 115 may generate the jump motion path defined by a target designation operation received by the teaching device 200. The target designation operation is an example of the one or more moving operations. The method by which the teaching device 200 receives the target designation operation is not particularly limited. For example, the teaching device 200 may receive a target designation operation based on an operation of selecting a taught motion command of the robot system 1 from a plurality of taught motion commands stored in the teaching motion storage unit 113. When a pre-recorded position is selected in the target designation operation, the path generation unit 115 may generate a jump motion path using the selected position as a target position. For example, when one taught motion command is selected from a plurality of taught motion commands stored in the teaching motion storage unit 113 as the pre-recorded position, the path generation unit 115 may generate the jump motion path using the taught position of the selected taught motion command as the target position.

A plurality of taught motion commands may be stored in the teaching motion storage unit 113 in a state of being grouped into a plurality of tasks. When one task is selected from the plurality of tasks as a pre-recorded position, the path generation unit 115 may generate a jump motion path using a taught position of one taught motion command (for example, the first taught motion command) among the selected tasks as a target position.

The pre-recorded position is not limited to a taught position. For example, the pre-recorded position may be a position variable recorded separately from the taught position, or may be an origin of various coordinate systems (for example, a workpiece coordinate system, a tool coordinate system, or a robot coordinate system).

The path generation unit 115 may not generate a path spanning from the current position to the target position, and may be configured to generate a path of at least a part of the route from the current position to the target position. For example, the path generation unit 115 may acquire a user-designated path defined by an operation on the teaching device 200 for a part of the route from the current position to the target position, generate a path in a section in which the user-designated path is not defined, and generate a jump motion path by combining the generated path and the user-designated path. The path generation unit 115 may generate a jump motion path so as to pass through one or more via points designated by the user by an operation on the teaching device 200.

The teaching device 200 may receive a target designation operation based on an operation to designate a point in a simulation of the robot 2 (for example, a still or moving image of the simulation). The robot controller 100 may further include a robot display unit 121. Based on the surrounding environmental information stored in the surrounding environment database 122, the robot display unit 121 causes the teaching device 200 to display a simulation of the robot 2 and the surrounding objects (for example, a still or moving image simulating the state of the robot 2 and the surrounding objects). When one point in the simulation of the robot 2 is designated in the target designation operation, the path generation unit 115 may generate a jump motion path using a position corresponding to the designated point as a target position.

The teaching device 200 may receive a target designation operation based on the recognition result of the voice of the operator. The teaching device 200 may receive a target designation operation based on the recognition result of the gesture of the operator indicating the target position in the real space.

The jump control unit 116 is configured to move the robot 2 from the current position to the target position in the generated jump motion path. For example, the jump control unit 116 moves the robot 2 based on one or more jump motion commands stored in the jump motion storage unit 123. For example, the jump control unit 116 repeats the jump control in the above-described control cycle. The jump control includes calculating respective target angles of the joints 31, 32, 33, 34, 35, 36 to move the robot 2 along a jump motion path represented by a plurality of jump motion commands and causing the respective angles of the joints 31, 32, 33, 34, 35, 36 to follow the target angles.

The jump control unit 116 may be configured to cause the robot 2 to suspend a motion of the robot toward the target position along the jump motion path in response to a suspension request by the one or more moving operations. For example, the jump control unit 116 may be configured to: cause the robot 2 to continue the motion toward the target position along the jump motion path in response to a continuous request by the one or more moving operations; and suspend the motion toward the target position in response to the suspension request by suspending the continuous request. For example, the jump control unit 116 may operate the robot 2 in the jump motion path while the jump operation to the target position continues, and may suspend the motion of the robot 2 when the jump operation is suspended while the robot 2 is operated in the jump motion path.

For example, the jump control unit 116 may operate the robot 2 in the jump motion path while the jump operation on the teaching device 200 continues, and may suspend the path motion of the robot 2 when the jump operation on the teaching device 200 is suspended while operating the robot 2 in the jump motion path. There is no particular limitation on the method by which the teaching device 200 receives the jump operation. For example, the teaching device 200 may receive a jump operation based on an operation on an object such as a key, may receive a jump operation based on a recognition result of a voice of the operator, or may receive a jump operation based on a recognition result of a gesture performed by the operator.

The jump control unit 116 may be configured to move, in response to a resumption request of the suspended motion by the one or more moving operations, the robot 2 to return on the jump motion path, and causing the robot 2 to resume the suspended motion. The jump control unit 116 may be configured to suspend a motion of the robot 2 toward the target position along the jump motion path in response to a suspension request by the one or more moving operations. For example, the jump control unit 116 may be configured to selectively execute, in response to a resumption request of the suspended path motion by the one or more moving operations, a control based on a current status of the robot, wherein the control is selected from the following controls. The jump control unit 116 may be configured to detect the current status of the robot based on a record of one or more motions of the robot executed after the time of suspending. For example, when the jump operation is restarted in a state where the motion of the robot 2 is suspended in the middle of the jump motion path, the jump control unit 116 may selectively execute one of the following controls based on the content of the motion executed in a state where the operation of the robot 2 is suspended (hereinafter referred to as "suspended state").

Resume control 1) Causing the robot to resume the suspended path motion

Resume control 2) Moving the robot 2 to return on the jump motion path, and subsequently causing the robot 2 to resume the suspended motion Resume control 3) Causing the path generation unit 115 to regenerate the path to the target position and moving the robot 2 toward the target position along the regenerated path The jump control unit 116 may be configured to: detect, as the current status, a positional deviation of the robot 2 from the jump motion path; select "resume control 2" (second control) in response to determining that the detected positional deviation is smaller than a predetermined threshold; and select "resume control 3" (third control) in response to determining that the detected positional deviation is greater than the threshold.

For example, the jump control unit 116 determines whether a motion is executed in the suspended state. If a motion is executed in the suspended state, the jump control unit 116 determines whether the motion in the suspended state is a recoverable motion that allows returning to the jump motion path. If it is determined that the motion in the suspended state is not executed, the jump control unit 116 executes "resume control 1" (first control). If it is determined that the recoverable motion is executed in the suspended state, the jump control unit 116 executes "resume control 2". If it is determined that a motion that is not the recoverable motion is executed in the suspended state, the jump control unit 116 executes "resume control 3".

Examples of the recoverable motion include a positional change of the robot 2 caused by temporarily cutting off power supply to the actuators 41, 42, 43, 44, 45, 46 (servo-off). Examples of a motion that is not the recoverable motion include motion of the robot 2 to a position that deviates from a jump motion path by a jog operation. Even if the jog operation is performed, if a deviation from the jump motion path due to the jog operation is small, resume control 2 may be performed. Therefore, the jog operation may be classified as a recoverable motion if the moving amount by the jog operation is less than a predetermined determination threshold value.

The robot controller 100 may be configured to add two or more positions to the plurality of taught positions by repeating, after moving the robot toward the target position by the jump control unit 116, operations including: moving, in response to determining that the moving direction and the moving amount are designated by the one or more moving operations, the robot 2 toward the moving direction by the moving amount by the jog control unit 111; and adding, in response to the adding operation, the position of the robot 2 at the time of the adding operation by the command addition unit 112.

The command addition unit 112 is configured to permit the adding operation after completion of a motion of the robot 2 started before the adding operation.

Figure 3:
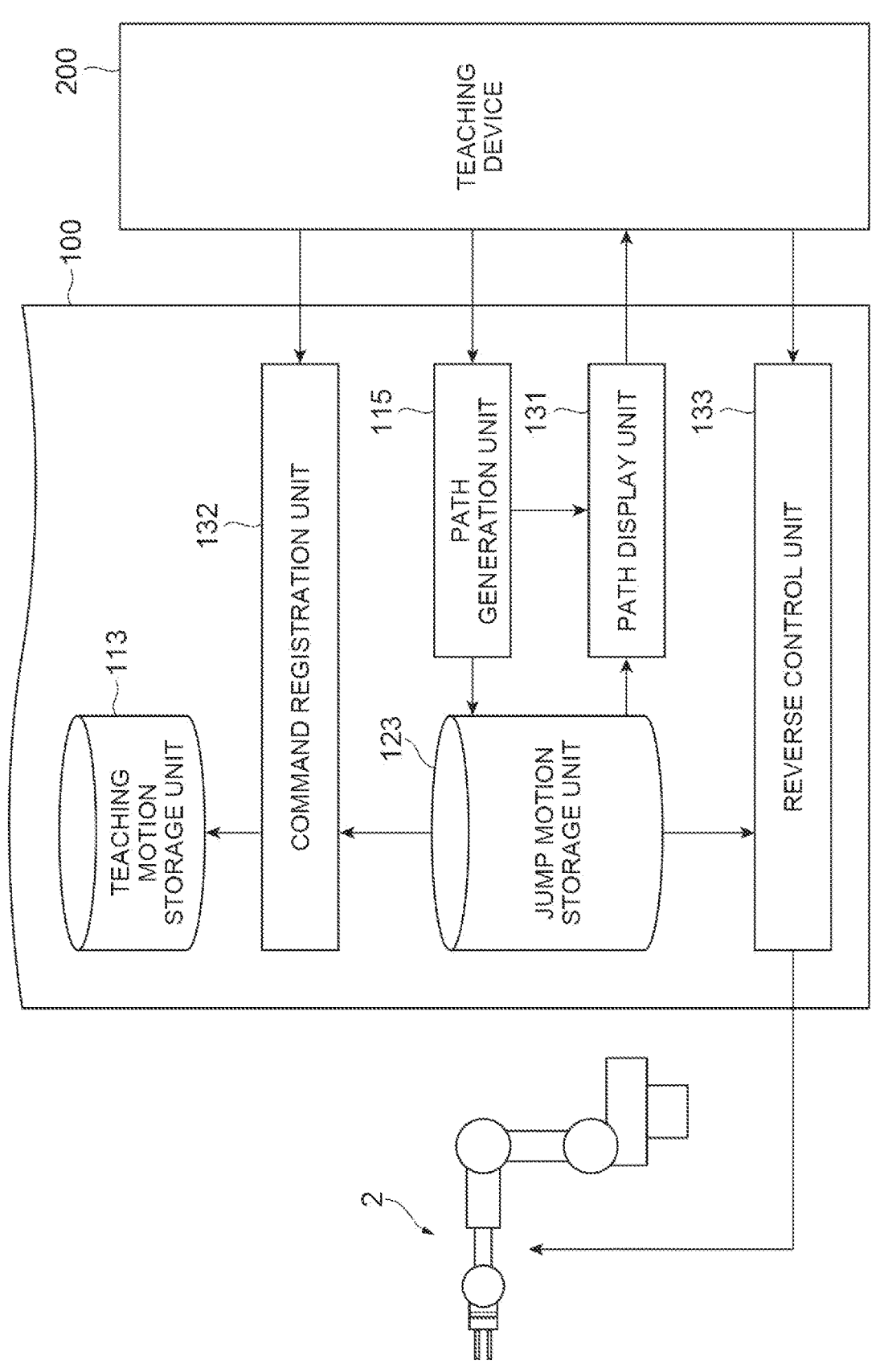
FIG. 3 is a block diagram illustrating a modification of the controller.

The robot controller 100 may be configured to display a jump motion path. For example, the robot controller 100 may further include a path display unit 131, as illustrated in FIG. 3. The path display unit 131 displays a simulation of the jump motion path stored in the jump motion storage unit 123 (generated by the path generation unit 115). The display mode of the simulation of the jump motion path may be any mode as long as the operator can visually recognize the jump motion path without actually operating the robot 2.

Examples of the display mode of the simulation of the jump motion path include the following.

Display mode 1) Displaying a line representing the jump motion path in a simulation image of the robot 2 and surrounding objects Display mode 2) Displaying one or more points representing one or more via positions of the jump motion path in the simulated image of the robot 2 and surrounding objects Display mode 3) Displaying a line of display mode 1 and a point of display mode 2 together Display mode 4) Moving the robot 2 along the jump motion path in the simulation image The path display unit 131 may not display the robot 2 itself in display modes 1 to 3, and the display of the robot 2 in display modes 1 to 3 may be displaying at least a part of the tip part 18 (for example, the end of the tool). The path display unit 131 may display the robot 2 in display mode 4 on at least a portion of the tip part 18 (for example, the end of the tool). If the jump motion path is reliable, the user may not pay attention to the interference of the robot 2 with surrounding objects and the robot 2 itself. In such a case, by limiting the display of the robot 2, the user's attention can be focused on the movement of the tip part 18 itself based on the jump motion path. For example, in a case where a motion based on the jump motion path is executed in a state where the tip part 18 holds a vessel containing a liquid, whether the motion can be executed without spilling the liquid may intensively be checked.

The jump control unit 116 may be configured to wait for an execution request by the one or more moving operations before moving the robot along the displayed path. For example, the jump control unit 116 may operate the robot 2 in the jump motion path if execution operation is received after display of the simulation of the jump motion path. Examples of the execution operation includes starting input of the jump operation described above.

The robot controller 100 may be configured to register the one or more jump motion commands as one or more taught motion commands when a command registration operation is received. For example, the robot controller 100 may further include a command registration unit 132. The command registration unit 132 may be configured to, in response to a command registration operation on the teaching device 200, add one or more via positions of the jump motion path to the taught positions. For example, when a command registration operation is received by the teaching device 200, the command registration unit 132 registers one or more jump motion commands stored in the jump motion storage unit 123 (generated by the path generation unit 115) in the teaching motion storage unit 113 as one or more taught motion commands. The command registration unit 132 may register all the jump motion commands stored in the jump motion storage unit 123 with the teaching motion storage unit 113, and may register a part of the jump motion commands stored in the jump motion storage unit 123 with the teaching motion storage unit 113.

The method by which the teaching device 200 receives the command registration operation is not particularly limited. For example, the teaching device 200 may receive a command registration operation based on an operation on an object such as a key, may receive a command registration operation based on a recognition result of a voice of the operator, or may receive a command registration operation based on a recognition result of a gesture performed by the operator.

The robot controller 100 may be configured to move the robot 2 in a direction away from the target position in the jump motion path when a reverse operation is received after the robot 2 operates in the jump motion path. For example, the robot controller 100 may further includes a reverse control unit 133. The reverse control unit 133 may be configured to cause the robot 2 to execute a reverse motion toward a direction away from the target position along the jump motion path in response to a reverse request by the one or more moving operations. For example, the reverse control unit 133 is configured to move the robot 2 in a direction away from the target position in the generated path when a reverse operation is received by the teaching device 200 after the robot 2 moves along the jump motion path. Note that "after the robot 2 operates in the jump motion path" includes "after the motion of the robot 2 is suspended in the middle of the jump motion path".

When the reverse operation is received, the reverse control unit 133 may selectively execute any one of the following controls based on the content of the motion executed in a state where the path motion of the robot 2 is suspended (hereinafter referred to as "suspended state").

Reverse control 1) Causing the robot 2 to move toward a direction away from the target position along the jump motion path to the start position of the jump motion path Reverse control 2) Moving the robot 2 to return on the jump motion path, and subsequently moving the robot 2 toward a direction away from the target position along the jump motion path to the start position of the jump motion path Reverse control 3) Causing the path generation unit 115 to regenerate a jump motion path to the start position and moving the robot 2 toward the start position along the regenerated jump motion path For example, the reverse control unit 133 determines whether a motion is executed in the suspended state. When a motion is executed in the suspended state, the reverse control unit 133 determines whether the motion is the recoverable motion. If it is determined that the motion in the suspended state is not executed, the reverse control unit 133 executes "reverse control 1". If it is determined that the recoverable motion is executed in the suspended state, the reverse control unit 133 executes "reverse control 2". If it is determined that a motion that is not the recoverable motion is executed in the suspended state, the reverse control unit 133 executes "reverse control 3".

The method by which the teaching device 200 receives the reverse operation is not particularly limited. For example, the teaching device 200 may receive the reverse operation based on an operation on an object such as a key, may receive the reverse operation based on a recognition result of a voice of the operator, or may receive the reverse operation based on a recognition result of a gesture performed by the operator.

The teaching device 200 includes an operation interface (for example, an operation panel) that allows an operator to input various operations. The teaching device 200 may include a hardware interface (for example, hardware keys) or a software interface (for example, software keys displayed on a touch panel).

Figure 4:
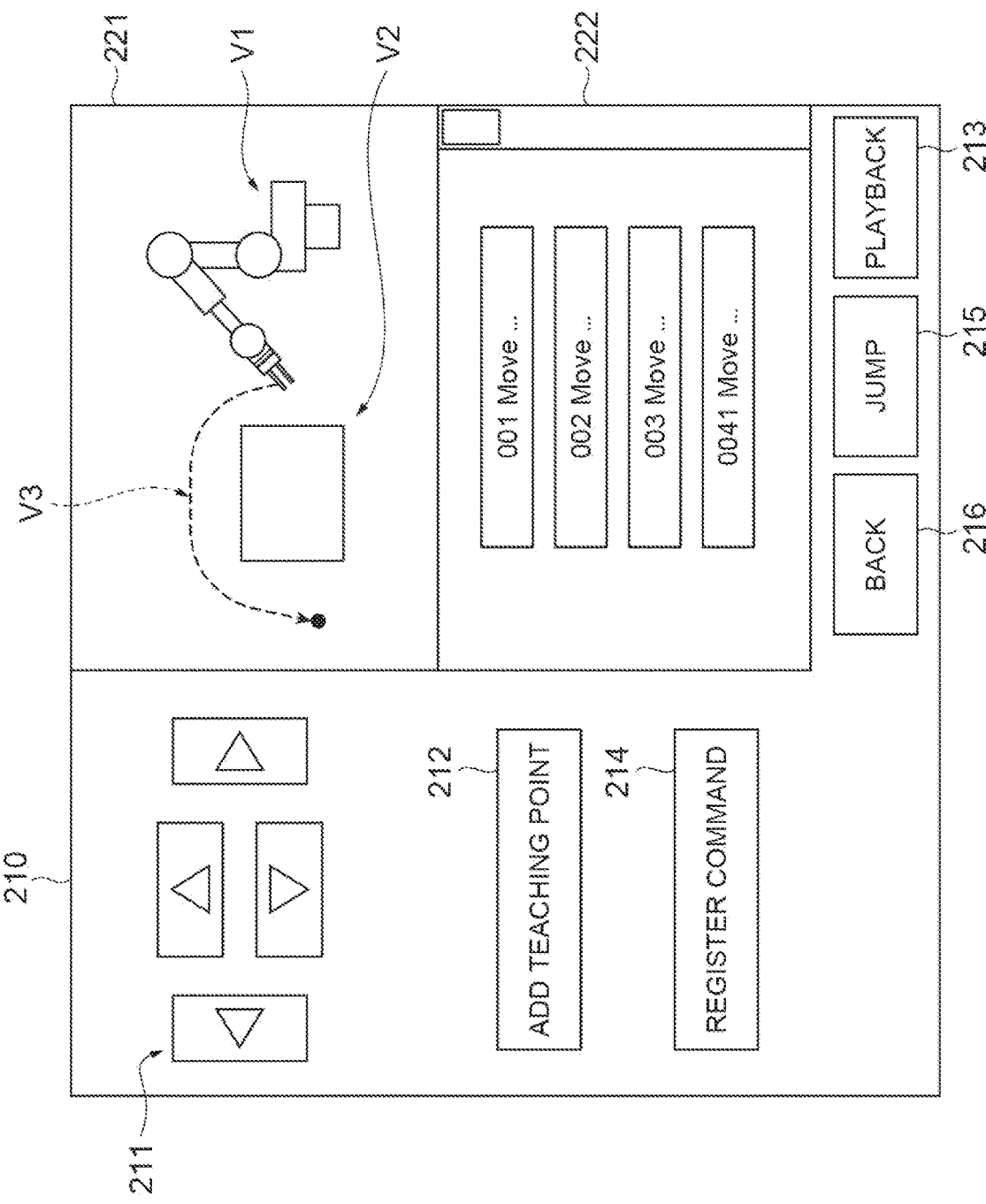
FIG. 4 is a schematic diagram illustrating an example operation screen of an operation device.

FIG. 4 is a diagram schematically illustrating an operation screen (an example of the operation panel) displayed on a touch panel by the teaching device 200 as an example of an interface by software. An operation screen 210 illustrated in FIG. 4 includes a jog operation key 211, a teaching point addition key 212, a simulation window 221, a command list 222, a playback key 213, a command registration key 214, a jump key 215, and a back key 216. The jog operation key 211 is a software key for inputting the jog operation described above. The teaching point addition key 212 is a software key for inputting the above-described adding operation of the taught position.

The simulation window 221 is a window that displays a simulation of the robot 2 generated by the robot display unit 121 and a simulation of the jump motion path generated by the path generation unit 115. In FIG. 4, a simulation image V1 of the robot 2, a simulation image V2 of a peripheral object of the robot 2, and a simulation line V3 representing the jump motion path are displayed.

The command list 222 is a window that displays a plurality of taught motion commands stored in the teaching motion storage unit 113 in chronological order. The playback key 213 is a software key for inputting the above-described playback operation. The command registration key 214 is a software key for inputting the above-described command registration operation. The jump key 215 is a software key for inputting the above-described jump operation. While the jump key 215 is pressed, the input of the jump operation described above is continued, and when the jump key 215 is released, the input of the jump operation is suspended. The back key 216 is a software key for inputting the above-described reverse operation.

Hardware Configuration

Figure 5:
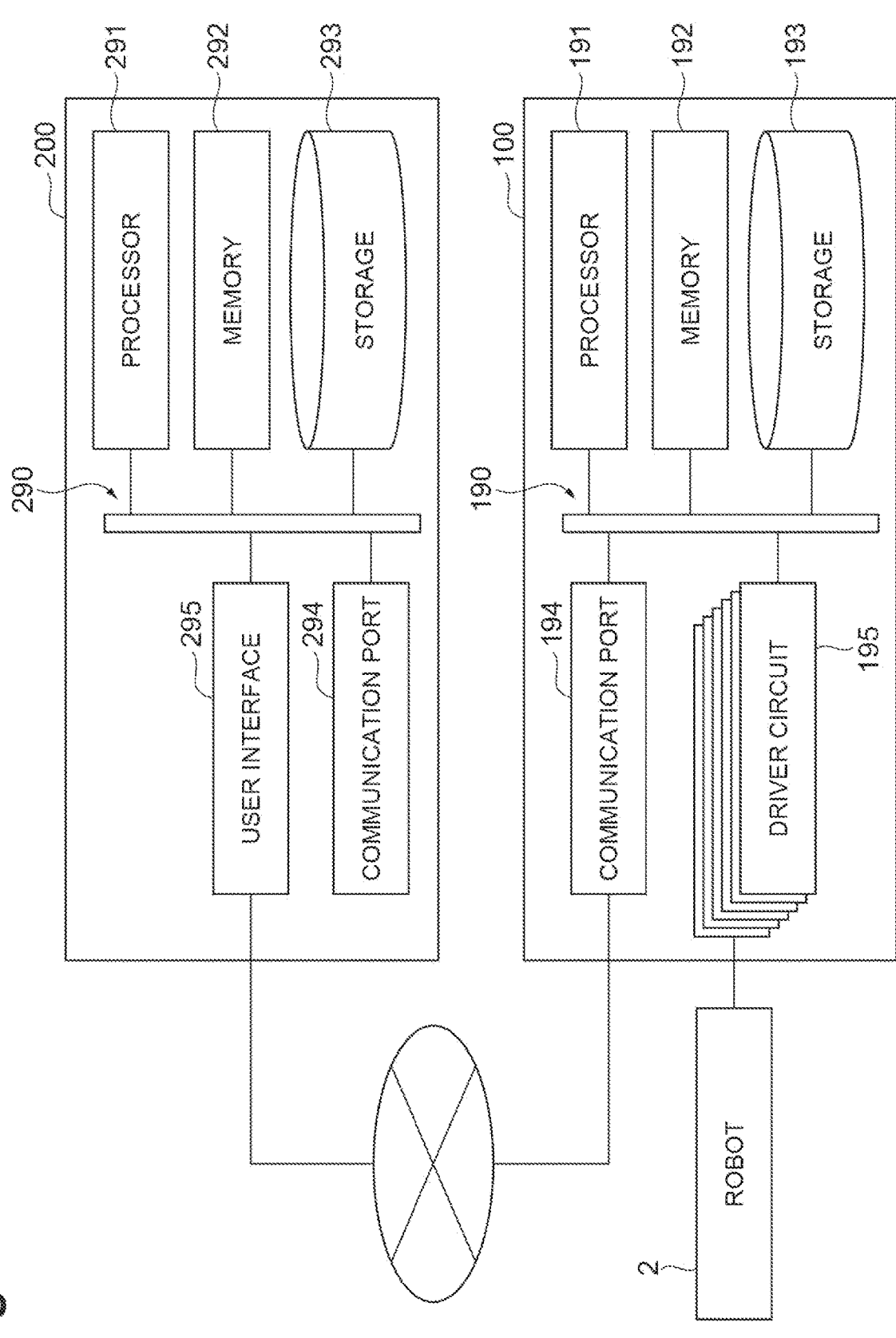
FIG. 5 is a block diagram illustrating an example hardware configuration of the controller and the operation device.

FIG. 5 is a block diagram illustrating hardware configurations of the robot controller 100 and the teaching device 200. The robot controller 100 includes circuitry 190. The circuitry 190 includes one or more processors 191, one or more memory devices 192, one or more storage devices 193, a communication port 194, and a driver circuit 195. The one or more storage devices 193 are non-volatile storage media, and store a program for causing the robot controller 100 to execute: generating, when a target designation operation designating a target position of the robot 2 is received, a path to the target position based on surrounding environmental information of the robot 2; and operating the robot 2 to the target position in the generated path. For example, one or more storage devices 193 store a program for configuring each functional block described above in the robot controller

100. Each of the one or more storage devices 193 may be a built-in storage medium such as a flash memory or a hard disk drive, or may be a portable storage medium such as a USB flash drive or an optical disk.

The one or more memory devices 192 temporarily store a program loaded from the one or more storage devices 193. Each of the one or more memory devices 192 may be a random-access memory or the like. One or more processors 191 configure each functional block described above by executing a program loaded into one or more memory devices 192. One or more processors 191 store the operation result in one or more memory devices 192.

The communication port 194 communicates with the teaching device 200 based on a request from one or more processors 191. The driver circuit 195 supplies drive power to the robot 2 (the actuators 41, 42, 43, 44, 45, 46) based on a request from one or more processors 191.

The teaching device 200 includes circuitry 290. The circuitry 290 includes one or more processors 291, one or more memory devices 292, one or more storage devices 293, a communication port 294, and a user interface 295. The at least one storage devices 293 are non-volatile storage media and store a program for configuring the operation interface in the teaching device 200. Each of the one or more storage devices 293 may be a built-in storage medium such as a flash memory or a hard disk drive, or may be a portable storage medium such as a USB flash drive or an optical disk.

The one or more memory devices 292 temporarily store a program loaded from the one or more storage devices 293. The one or more memory devices 292 may be a random-access memory or the like. The one or more processors 291 configure the operation interface by executing the program loaded on the one or more memory devices 292. The one or more processors 291 store the operation result in one or more memory devices 292.

The communication port 294 communicates with the robot controller 100 based on a request from one or more processors 291. The user interface 295 communicates with the operator based on a request from the one or more processors 291. For example, the user interface 295 includes display devices and input devices. Examples of the display device include a liquid crystal monitor and an organic EL (Electro-Luminescence) monitor. Examples of the input device include a keyboard, a mouse, or a keypad. The input device may be integrated with the display device as a touch panel.

The hardware configuration described above is merely an example and can be modified. For example, the teaching device 200 may be incorporated into the robot controller 100.

Control Procedure

As an example of the control method, a control procedure executed by the robot controller 100 will be described. The procedure includes: generating, when a target designation operation designating a target position of the robot 2 is received, a path to the target position based on surrounding environmental information of the robot 2; and operating the robot 2 to the target position in the generated path. Hereinafter, the control procedure will be described in detail by dividing it into a teaching procedure, a jump control procedure, a resuming procedure of a jump motion, and a reversing procedure of the jump motion.

Teaching Procedure

Figure 6:
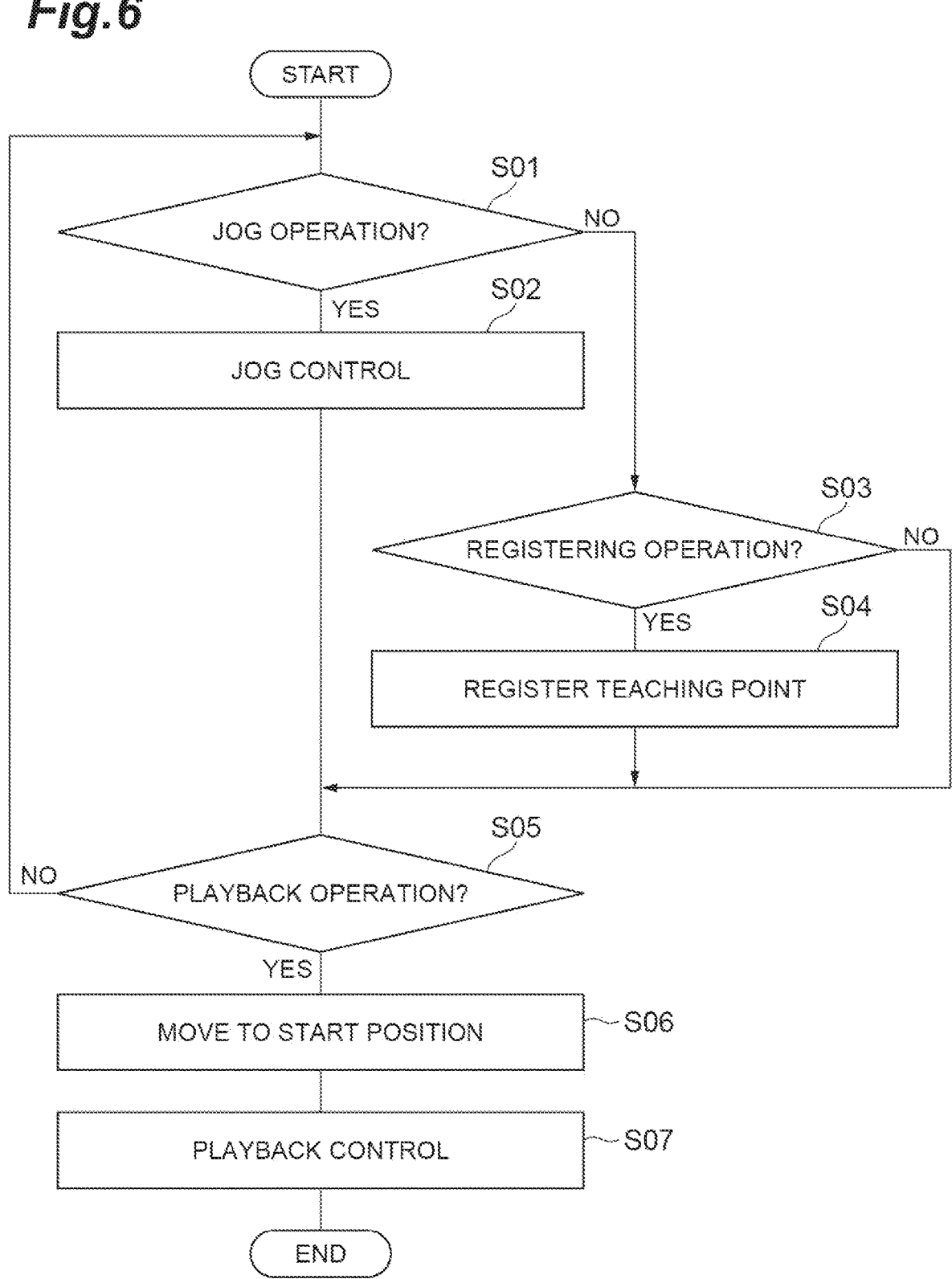
FIG. 6 is a flowchart illustrating an example teaching procedure.

As illustrated in FIG. 6, the robot controller 100 first executes operation S01. In operation S01, the jog control unit 111 checks whether the jog operation described above is received. If it is determined in operation S01 that jog operation is received, the robot controller 100 executes operation S02. In operation S02, the jog control unit 111 operates the robot 2 in accordance with the jog operation.

If it is determined in operation S01 that jog operation is not received, the robot controller 100 executes operation S03. In operation S03, the command addition unit 112 checks whether the adding operation of the taught position described above is received. If it is determined in operation S03 that the adding operation of the taught position is received, the robot controller 100 executes operation S04. In operation S04, a taught motion command is generated using the position of the robot 2 at the time point when the adding operation of taught position is received as the taught position, and is stored in the teaching motion storage unit 113.

After operations S02 or S04, the robot controller 100 executes operation S05. If it is determined that the adding operation of the taught position is not received in operation S03, the robot controller 100 executes operation S05 without executing operations S02 and S04.

In operation S05, the playback control unit 114 checks whether the playback operation described above is received. If it is determined in operation S05 that the playback operation is not received, the robot controller 100 returns the processing to operation S01. Thereafter, the motion of the robot 2 in response to the jog operation and the addition of the taught motion command are repeated until the playback operation is received.

If it is determined in operation S05 that a playback operation is received, the robot controller 100 executes operations S06 and S07. In operation S06, the playback control unit 114 operates the robot 2 to the start position of the taught operation path. In operation S07, the playback control unit 114 sequentially calls a plurality of taught motion commands and causes the robot 2 to execute a motion represented by the taught positions of the plurality of taught motion commands. Thus, the teaching procedure is completed.

Jump Control Procedure

Figure 7:
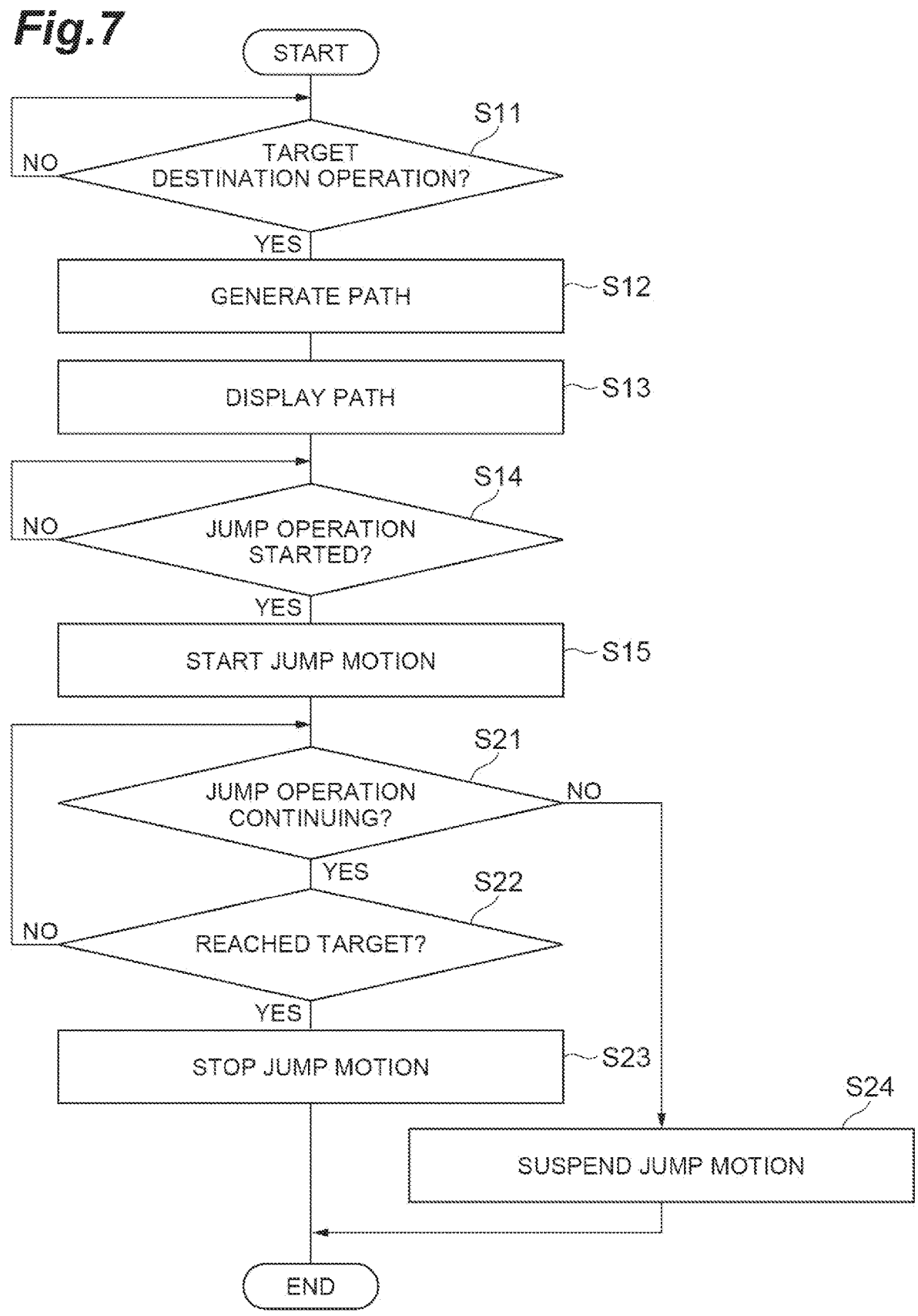
FIG. 7 is a flowchart illustrating an example jump control procedure to a designated target position.

As illustrated in FIG. 7, the robot controller 100 executes operations S11, S12, and S13. In operation S11, the path generation unit 115 waits for the above-described target designation operation to be received. In operation S12, the path generation unit 115 generates a jump motion path from the current position to the target position based on surrounding environmental information stored in the surrounding environment database 122. For example, the path generation unit 115 generates one or more jump motion commands as described above and stores them in the jump motion storage unit 123. In operation S13, the path display unit 131 displays a simulation of the jump motion path stored in the jump motion storage unit 123. For example, the path display unit 131 causes the simulation window 221 of the teaching device 200 to display a simulation of the jump motion path.

Next, the robot controller 100 executes operations S14 and S15. In operation S14, the jump control unit 116 waits for the jump operation described above to be received. In operation S15, the jump control unit 116 begins to operate the robot 2 to the target position in the jump motion path. Hereinafter, the motion to the target position along the jump motion path is referred to as "jump motion".

Next, the robot controller 100 executes operation S21. In operation S21, the jump control unit 116 checks whether the jump operation continues. If it is determined in operation S21 that the jump operation continues, the robot controller 100 executes operation S22. In operation S22, the jump control unit 116 checks whether the robot 2 has reached the target position. If it is determined in operation S22 that the robot 2 has not reached the target position, the robot controller 100 returns the processing to operation S21. Thereafter, as long as the jump operation continues, the jump motion continues until the robot 2 reaches the target position.

If it is determined in operation S22 that the robot 2 has reached the target position, the robot controller 100 executes operation S23. In operation S23, the jump control unit 116 causes the robot 2 to stop the jump motion. If it is determined in operation S21 that the jump operation is suspended, the robot controller 100 executes operation S24. In operation S24, the jump control unit 116 causes the robot 2 to suspend the jump motion. Thus, the jump control procedure is completed.

Resuming Procedure of Jumping Motion

Figure 8:
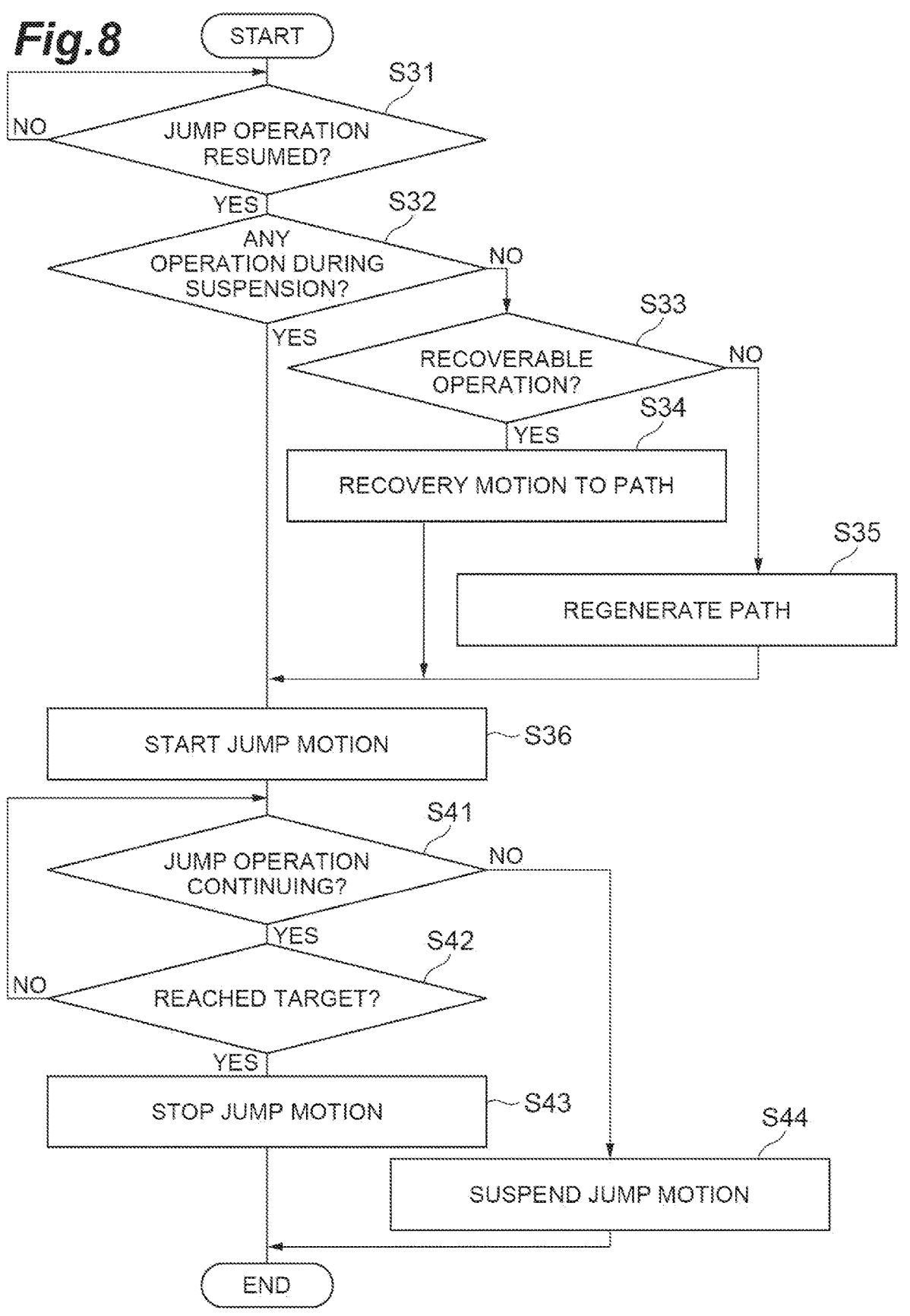
FIG. 8 is a flowchart illustrating an example resuming procedure of a jump motion.

This procedure is executed after the jump motion is suspended in operation S24 described above. As illustrated in FIG. 8, the robot controller 100 executes operations S31 and S32. In operation S31, the jump control unit 116 waits for the jump operation to be resumed. In operation S32, the jump control unit 116 checks whether a motion is executed in a state in which the jump motion is suspended (the suspended state).

If it is determined in operation S32 that a motion is executed in the suspended state, the robot controller 100 executes operation S33. In operation S33, the jump control unit 116 checks whether the motion made in the suspended state is the recoverable motion. If it is determined in operation S33 that the motion made in the suspended state is the recoverable motion, the robot controller 100 executes operation S34. In operation S34, the jump control unit 116 operates the robot 2 to the position at which the jump motion was suspended. If it is determined in operation S33 that the motion made in the suspended state is not recoverable motion, the robot controller 100 executes operation S35. In operation S35, the jump control unit 116 causes the path generation unit 115 to regenerate the path to the target position.

After operations S34 and S35, the robot controller 100 executes operation S36. If it is determined in operation S32 that no motion is executed in the suspended state, the robot controller 100 executes operation S36 without executing operations S34 and S35. In operation S36, the jump control unit 116 resumes the jump motion.

Next, the robot controller 100 executes operation S41. In operation S41, the jump control unit 116 checks whether the jump operation continues. If it is determined in operation S41 that the jump operation continues, the robot controller 100 executes operation S42. In operation S42, the jump control unit 116 checks whether the robot 2 has reached the target position. If it is determined in operation S42 that the robot 2 has not reached the target position, the robot controller 100 returns the processing to operation S41. Thereafter, as long as the jump operation continues, the jump motion continues until the robot 2 reaches the target position.

If it is determined in operation S42 that the robot 2 has reached the target position, the robot controller 100 executes operation S43. In operation S43, the jump control unit 116 causes the robot 2 to stop the jump motion. If it is determined in operation S41 that the jump operation is suspended, the robot controller 100 executes operation S44. In operation S44, the jump control unit 116 causes the robot 2 to suspend the jump motion. Thus, the resuming procedure of jump motion is completed.

In operation S44, when the jump motion is suspended, the resuming procedure of the jump motion described above can be executed again.

Reversing Procedure of Jump Motion

Figure 9:
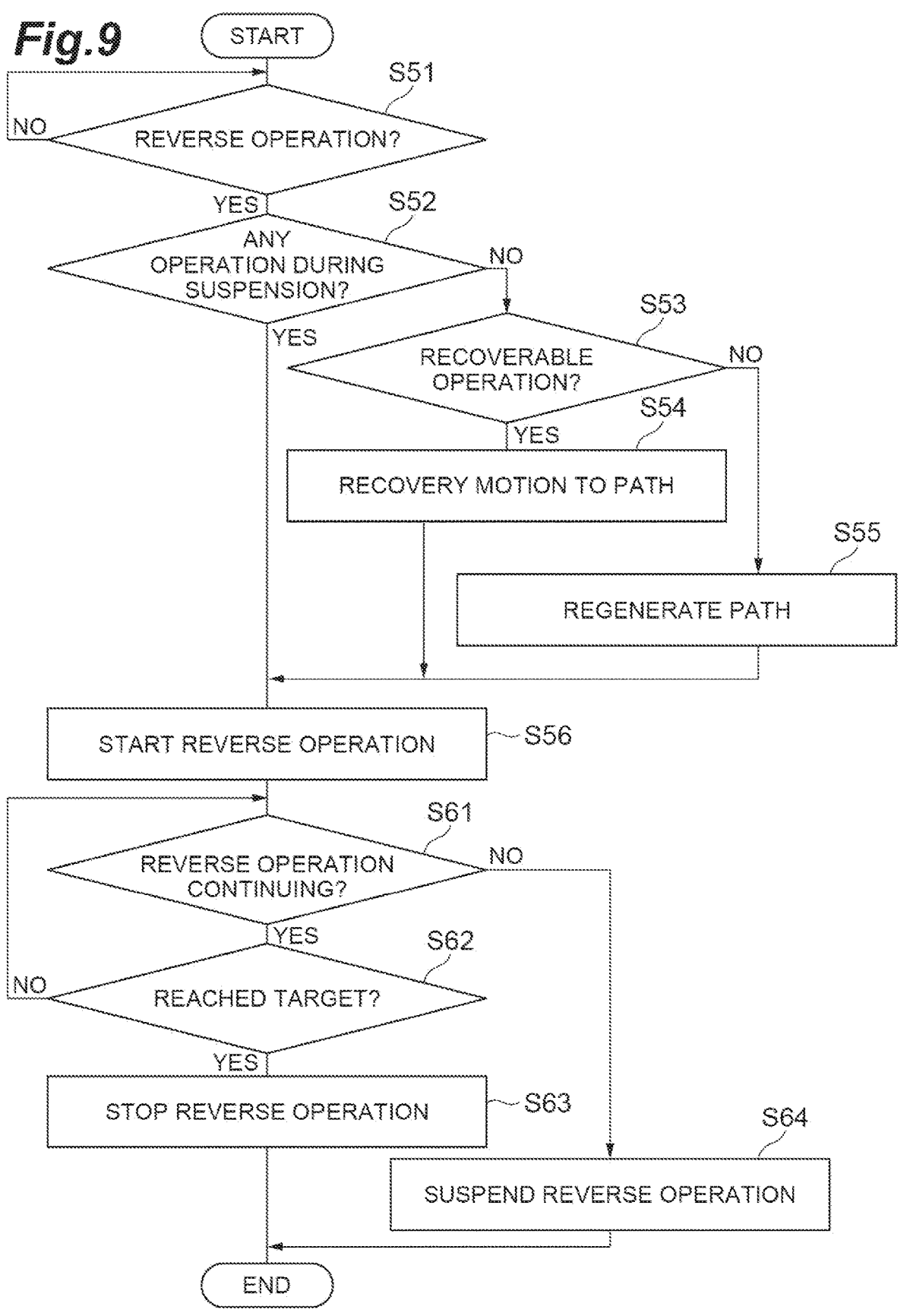
FIG. 9 is a flowchart illustrating an example reversing procedure of a jump motion.

This procedure is executed after the jump motion is stopped in operation S23 described above or after the jump motion is suspended in operation S24. Hereinafter, both after the jump motion is stopped in the above-described operation S23 and after the jump motion is suspended in the operation S24 are referred to as "suspended state". As illustrated in FIG. 9, the robot controller 100 executes operations S51 and S52. In operation S51, the reverse control unit 133 waits for reverse operation to be received. In operation S52, the reverse control unit 133 checks whether a motion is executed in the suspended state.

If it is determined in operation S52 that the motion has been executed in the suspended state, the robot controller 100 executes operation S53. In operation S53, the reverse control unit 133 checks whether the motion executed in the suspended state is the recoverable motion. If it is determined in operation S53 that the motion executed in the suspended state is the recoverable motion, the robot controller 100 executes operation S54. In operation S54, the reverse control unit 133 operates the robot 2 to the position where the suspended state was initiated. If it is determined in operation S53 that the motion made in the suspended state is not the recoverable motion, the robot controller 100 executes operation S55. In operation S55, the reverse control unit 133 causes the path generation unit 115 to regenerate the jump motion path to the starting position of the jump motion.

After operations S54 and S55, the robot controller 100 executes operation S56. If it is determined in operation S52 that no motion has been executed in the suspended state, the robot controller 100 executes operation S56 without executing operations S54 and S55. In operation S56, the reverse control unit 133 begins to move the robot 2 in the jump motion path to the start position of the jump motion. Hereinafter, a motion to the start position of the jump motion path in the jump motion path is referred to as a "reverse motion".

Next, the robot controller 100 executes operation S61. In operation S61, the reverse control unit 133 checks whether the reverse operation continues. If it is determined in operation S61 that the reverse operation continues, the robot controller 100 executes operation S62. In operation S62, the reverse control unit 133 checks whether the robot 2 has reached the start position. If it is determined in operation S62 that the robot 2 has not reached the start position, the robot controller 100 returns the processing to operation S61. Thereafter, as long as the reverse operation continues, the reverse motion continues until the robot 2 reaches the start position.

If it is determined in operation S62 that the robot 2 has reached the start position, the robot controller 100 executes operation S63. In operation S63, the reverse control unit 133 causes the robot 2 to stop reverse motion. If it is determined in operation S61 that reverse operation has been suspended, the robot controller 100 executes operation S64. In operation S64, the reverse control unit 133 causes the robot 2 to suspend reverse motion. This completes the reversing procedure of the jump motion.

In operation S64, when the reverse motion is suspended, the resuming procedure of the jump motion or the reversing procedure of the jump motion can be executed again.

As described above, the robot controller 100 includes: a path generation unit 115 configured to generate, in response to determining that a target position is designated by the one or more moving operations on the teaching device 200, a path from a current position of the robot 2 to the target position by simulation of moving the robot 2 based on surrounding environmental information of the robot 2; and a jump control unit 116 configured to move the robot toward the target position along the generated path.

With this the robot controller 100, if the target position is designated, a path to the target position is automatically generated, so that the labor of manual operation in teaching is reduced. Therefore, the efficiency of teaching may be improved.

The path generation unit 115 may be configured to calculate one or more via positions including the target position for preventing the robot 2 from interfering with the peripheral objects based on the surrounding environmental information, and the jump control unit 116 may be configured to cause the robot 2 to execute the path motion based on the calculated one or more via positions. The path generation time can be shortened by simplifying calculation for the path generation. Therefore, the efficiency of teaching may further be improved.

The robot controller 100 may include: the command addition unit 112 configured to, in response to the adding operation on the teaching device, add a position of the robot at a time of the adding operation to the taught positions; and a playback control unit 114 configured to, in response to the one or more moving operations, cause the robot 2 to execute a playback motion based on the taught positions including the added position. During the operation of sequentially adding the taught positions, the robot 2 may readily be moved to a position desired to be a new taught position, a taught position registered one or more times before, or the like. Therefore, the efficiency of teaching may further be improved.

The path generation unit 115 may be configured to display a list of positions on the teaching device 200; and generate, in response to determining that the target position is selected from the list by the one or more moving operations, the path to the selected target position. Since the target position can be designated quickly, the efficiency of teaching may further be improved.

The path generation unit 115 may be configured to display the list of positions including the taught positions. When returning the robot to the already recorded taught position, the target position can be quickly designated, and the efficiency of teaching may further be improved.

The robot controller 100 may further include the command registration unit 132 configured to configured to, in response to a command registration operation on the teaching device, add one or more via positions of the generated path to the taught positions. By diverting the jump motion command as a taught motion command, the teaching can be made more efficient.

The robot controller 100 may further include the path display unit 131 configured to display a simulation of the generated path on the teaching device 200, and wherein the jump control unit 116 may be configured to wait for an execution request by the operator on the teaching device before moving the robot along the displayed path. As such, a sense of security of an operator who performs teaching can be improved.

The robot controller 100 may further include the robot display unit 121 configured to display a simulated image of the robot 2 on the teaching device 200, and wherein the path generation unit is configured to generate, in response to determining that the target position is identified in the image of the robot 2, the path to the identified target position. An arbitrary target position can be readily designated. Therefore, the efficiency of teaching may further be improved.

The jump control unit 116 may be configured to: cause the robot 2 to continue the motion toward the target position along the generated path in response to a continuous request by the one or more moving operations; and suspend the motion toward the target position in response to the suspension request by suspending the continuous request. The motion of the robot 2 can be suspended at a position closer to the intention of the operator.

The jump control unit 116 may be configured to, in response to a resumption request of the suspended path motion by the one or more moving operations, selectively execute a control based on a current status of the robot, wherein the control is selected from: a first control that includes causing the robot 2 to resume the suspended motion; a second control that includes moving the robot 2 to return on the generated path, and causing the robot 2 to resume the suspended motion; and a third control that includes causing the path generation unit 115 to regenerate the path to the target position and moving the robot 2 toward the target position along the regenerated path. The robot 2 can be operated suitably to the current status of the robot in response to the resumption of the operation.

The robot controller 100 may further include the reverse control unit 133 configured to cause the robot 2 to execute a reverse motion toward a direction away from the target position along the generated path in response to a reverse request by the one or more moving operations. The generated path can also be used for a motion toward a direction away from the target position.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A robot system comprising:
   a robot;
   a robot controller configured to control the robot using a plurality of taught positions; and
   a teaching device communicative with the robot controller and configured to receive operations by an operator that manually operates the robot by using the teaching device,
   wherein the robot controller comprises circuitry configured to:
   receive an operation on the teaching device while the operator manually operates the robot;
   identify a type of the received operation;
   generate, in response to determining that the type of the received operation is a target request that designates a target position of the robot, a path from a current position of the robot to the target position by simulation of moving the robot based on surrounding environmental information of the robot;
   move the robot toward the target position along the generated path;
   move, in response to determining that the type of the received operation is a moving request that designates a moving direction of the robot, the robot toward the moving direction;
   add, in response to determining that the type of the received operation is an adding request, a new taught position of the robot to the plurality of taught positions, wherein the new taught position is identified after moving the robot in response to determining the type of the received operation; and cause, in response to determining that the type of the received operation is a playback request, the robot to playback a taught motion defined by the plurality of taught positions including the new taught position identified after moving the robot.

2. The robot system according to claim 1, wherein the circuitry is configured to add two or more new taught positions to the plurality of taught positions by repeating, after moving the robot toward the target position, operations including:

receiving an additional operation on the teaching device while the operator manually operates the robot;

identifying a type of the additional operation;

moving, in response to determining that the type of the additional operation is the moving request, the robot to move toward the moving direction; and adding, in response to determining that the additional operation is the adding request, the new taught position of the robot, wherein the new taught position is identified after moving the robot in response to determining the type of the additional operation.

3. The robot system according to claim 2, wherein the circuitry is configured to permit the adding request after completion of a motion of the robot started before the adding request.

4. The robot system according to claim 1, wherein the circuitry is configured to:

display a list of positions on the teaching device;

receive an input of the operator that designates a position selected from the list of positions; and generate, in response to determining that the target position is the selected position, the path to the target position.

5. The robot system according to claim 1, wherein the circuitry is further configured to add, in response to determining that the type of the received operation is a registration request on the teaching device, one or more via positions of the generated path to the plurality of taught positions.

6. The robot system according to claim 1, wherein the circuitry is further configured to display the generated path on the teaching device and wait for an execution request by the operator on the teaching device before moving the robot along the displayed path.

7. The robot system according to claim 1, wherein the circuitry is further configured to:

display a simulated image of the robot on the teaching device;

receive an input of the operator that identifies a selected position in the image of the robot; and generate, in response to determining that the target position is the selected position identified in the image of the robot, the path to the target position.

8. The robot system according to claim 1, wherein the circuitry is configured to suspend a motion of the robot toward the target position along the generated path in response to determining that the type of the received operation is a suspension request on the teaching device.

9. The robot system according to claim 8, wherein the circuitry is configured to:

cause the robot to continue the motion toward the target position along the generated path in response to determining that the type of the received operation is a continuous request on the teaching device; and suspend the motion toward the target position in response to determining that the type of the received operation is the suspension request by suspending the continuous request on the teaching device.

10. The robot system according to claim 9, wherein the circuitry is configured to move, in response to determining that the type of the received operation is a resumption request of the suspended motion on the teaching device, the robot to return on the generated path, and causing the robot to resume the suspended motion.

11. The robot system according to claim 9, wherein the circuitry is configured to regenerate, in response to determining that the type of the received operation is a resumption request of the suspended motion on the teaching device, the path to the target position and move the robot toward the target position along the regenerated path.

12. The robot system according to claim 9, wherein the circuitry is configured to selectively execute, in response to determining that the type of the received operation is a resumption request of the suspended motion on the teaching device, a control based on a current status of the robot, wherein the control is selected from:

a first control that includes causing the robot to resume the suspended motion;

a second control that includes moving the robot to return on the generated path, and causing the robot to resume the suspended motion; and a third control that includes regenerating a path to the target position and moving the robot toward the target position along the regenerated path.

13. The robot system according to claim 12, wherein the circuitry is configured to detect the current status of the robot based on a record of controlling the robot after the time of suspending.

14. The robot system according to claim 12, wherein the circuitry is configured to:

detect, as the current status, a positional deviation of the robot from the generated path;

select the second control in response to determining that the detected positional deviation is smaller than a predetermined threshold; and select the third control in response to determining that the detected positional deviation is greater than the threshold.

15. The robot system according to claim 1, wherein the circuitry is further configured to cause the robot to execute a reverse motion toward a direction away from the target position along the generated path in response to determining that the type of the received operation is a reverse request on the teaching device.

16. A robot system according to claim 1, wherein the circuitry is further configured to:

suspend, in response to determining that the type of the received operation is a suspension request on the teaching device, a motion of the robot toward the target position along the generated path;

detect, in response to determining that the type of the received operation is a resumption request of the suspended motion on the teaching device, a positional deviation of the robot from the generated path;

move, in response to determining that the detected positional deviation is smaller than a predetermined threshold, the robot to return on the generated path and resume the suspended motion; and regenerate, in response to determining that the detected positional deviation is greater than the threshold, a path to the target position and move the robot toward the target position along the regenerated path.

17. A control method comprising:

receiving an operation on a teaching device while an operator manually operates the robot by using the teaching device;

identifying a type of the received operation;

generating, in response to determining that the type of the received operation is a target request that designates a target position of the robot, a path from a current position of the robot to the target position by simulation of moving the robot based on surrounding environmental information of the robot;

moving the robot toward the target position along the generated path;

moving, in response to determining that the type of the received operation is a moving request that designates a moving direction of the robot, the robot toward the moving direction;

adding, in response to determining that the type of the received operation is an adding request, a new taught position of the robot to the plurality of taught positions, wherein the new taught position is identified after moving the robot in response to determining the type of the received operation; and causing, in response to determining that the type of the received operation is a playback request, the robot to playback a taught motion defined by the plurality of taught positions including the new taught position identified after moving the robot.

18. The control method according to claim 17, further comprising:

suspending, in response to determining that the type of the received operation is a suspension request on the teaching device, a motion of the robot toward the target position along the generated path;

detecting, in response to determining that the type of the received operation is a resumption request of the suspended motion on the teaching device, a positional deviation of the robot from the generated path;

moving, in response to determining that the detected positional deviation is smaller than a predetermined threshold, the robot to return on the generated path and resume the suspended motion; and regenerating, in response to determining that the detected positional deviation is greater than the threshold, a path to the target position and move the robot toward the target position along the regenerated path.

19. A non-transitory memory device having instructions stored thereon that, in response to execution by a processing device, cause the processing device to perform operations comprising:

receiving an operation on a teaching device while an operator manually operates the robot by using the teaching device;

identifying a type of the received operation;

generating, in response to determining that the type of the received operation is a target request that designates a target position of the robot, a path from a current position of the robot to the target position by simulation of moving the robot based on surrounding environmental information of the robot;

moving the robot toward the target position along the generated path;

moving, in response to determining that the type of the received operation is a moving request that designates a moving direction of the robot, the robot toward the moving direction;

adding, in response to determining that the type of the received operation is an adding request, a new taught position of the robot to the plurality of taught positions, wherein the new taught position is identified after moving the robot in response to determining the type of the received operation; and causing, in response to determining that the type of the received operation is a playback request, the robot to playback a taught motion defined by the plurality of taught positions including the new taught position identified after moving the robot.

20. The non-transitory memory device according to claim 19, wherein the operations further comprise:

suspending, in response to determining that the type of the received operation is a suspension request on the teaching device, a motion of the robot toward the target position along the generated path;

detecting, in response to determining that the type of the received operation is a resumption request of the suspended motion on the teaching device, a positional deviation of the robot from the generated path;

moving, in response to determining that the detected positional deviation is smaller than a predetermined threshold, the robot to return on the generated path and resume the suspended motion; and regenerating, in response to determining that the detected positional deviation is greater than the threshold, a path to the target position and move the robot toward the target position along the regenerated path.

\* \* \* \* \*